United States Patent [19]
Dutcher et al.

[11] Patent Number: 5,175,821
[45] Date of Patent: Dec. 29, 1992

[54] PRINTER INTERFACE WITH MEMORY BUS ARBITRATION

[75] Inventors: Alan P. Dutcher, Mount Laurel; Stephen D. Gluyas, Berlin, both of N.J.

[73] Assignee: Oki America Inc., Hackensack, N.J.

[21] Appl. No.: 661,571

[22] Filed: Feb. 26, 1991

[51] Int. Cl.⁵ .................... G06F 3/00; G06F 13/16
[52] U.S. Cl. .................... 395/275; 395/425; 395/110
[58] Field of Search .......... 364/DIG. 1, DIG. 2; 395/275, 425, 110, 150, 164

[56] References Cited

U.S. PATENT DOCUMENTS 4,954,979  9/1990  Eibner et al. .................. 395/150
4,992,956  2/1991  Kaku et al. .................... 395/114

Primary Examiner—Robert L. Richardson
Attorney, Agent, or Firm—Panitch Schwarze Jacobs & Nadel

[57] ABSTRACT

An interface system for a printer and a print font chip includes an I/O port which is integral with the printer and receives from the printer address bits, data bits and control logic. A memory bus is electrically connected to the I/O port. The memory bus transmits and receives address bits, data bits and control logic from the I/O port. At least one print font chip is capable of generating address bits, data bits and control logic. Interfacing circuitry interfaces the memory bus and at least one font chip. The interfacing circuitry is bidirectional and capable of transmitting address bits, data bits and control logic between the bus and the font chip. Bus arbitration circuitry accesses the memory bus by at least one font chip. The arbitration circuitry is characterized in terms of priority. The font chips are assigned a predetermined priority by which access to the memory bus is determined.

36 Claims, 4 Drawing Sheets

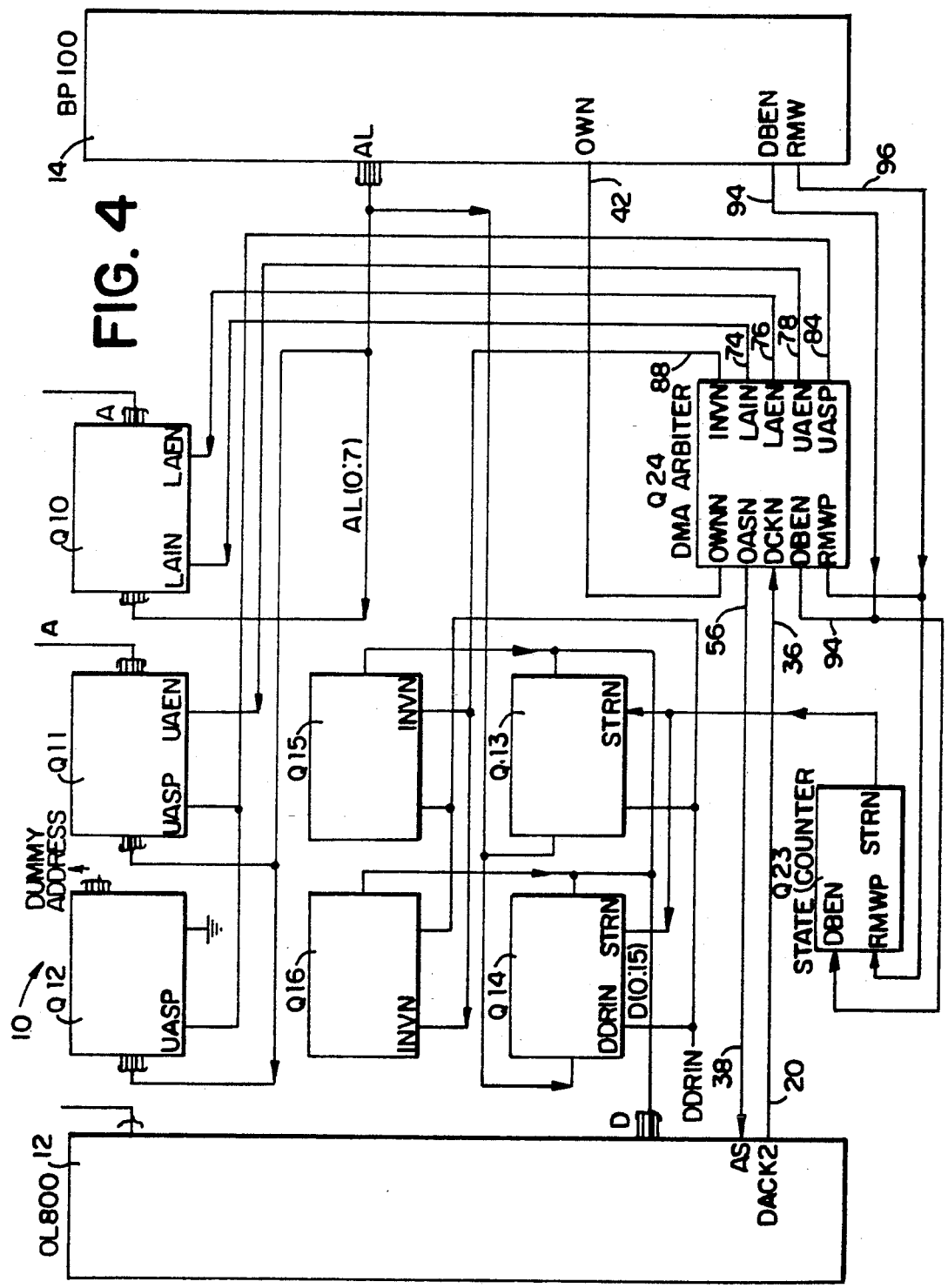

PRINTER INTERFACE WITH MEMORY BUS ARBITRATION

FIELD OF THE INVENTION

This invention relates to an interfacing system between a coprocessor and a printer in a multiboard system and more particularly to an option board which interfaces a font scaling chip and an LED page printer.

BACKGROUND OF THE INVENTION

The traditional method for interfacing between various boards in a multiboard system is by using a standard system bus. A good bus standard provides the guidelines necessary for an independent designer to design various boards or option cards that will work together. System buses generally utilize address bits, data bits and control logic, plus additional logic for bus arbitration, system control and power. Important criteria in choosing a microprocessor bus is the number of bits on the data bus, the width of the address bus, the types of interrupts and the types of data transfer control, i.e., synchronous or asynchronous. System buses may be multiplexed or nonmultiplexed and many follow standard Motorola architecture. Motorola style buses typically have a read-write line and a data strobe and use memory-mapped input/output.

Many system buses are able to handle multiple masters. A multimaster bus allows several coprocessors to share the system bus and requires additional arbitration logic. In addition, buses with data paths larger than 8 bits, generally allow data transfers that use part of the data path. A bus with a 32 bit data path, for example, may allow transfers of single bytes or 16-bit words in addition to full 32 bit transfers.

System buses are either synchronous or asynchronous. A synchronous bus operates in synchronization with a system bus clock. An asynchronous bus allows signals to be asynchronous to the system clock and operates by using various strobes to initiate signals. For example, a Motorola system microprocessor provides a data transfer acknowledgment signal which indicates that the memory is ready to perform a read or write operation after it has been requested by the processor of a direct memory accessing peripheral. Once the data has been transferred to a dynamic random access memory (DRAM), the data may be printed onto a page. In many cases, a full page of DRAM is unavailable for printing due to the high cost of the DRAM so smaller DRAM pages had to be designed. One method of providing a smaller amount of DRAM onto a page is by using band buffers.

Among the problems associated with interface systems in a multiboard system are that the hardware on the various boards is not always compatible. The interface must then be designed in order to specifically provide for the problems created by the hardware inconsistencies.

The present invention provides an interface system between an incompatible print font coprocessor and controller board. In the described embodiment, the font coprocessor comprises a Blue Point 100 font scaling chip which supports all the features needed to render scalable characters including functions specific to character rendering. The Blue Point 100 (BP100) follows standard Motorola architecture for bus arbitration. The controller board comprises the controller of an existing Okidata (Oki) printer known as the OL800. The OL800 is an eight page per minute printer which uses a proprietary LED array to write images on a photosensitive drum which in turn, transforms the image to a single sheet of paper stock. Unlike the BP100 chip, the Oki OL800 controller follows its own arbitration scheme which is not the same as standard Motorola architecture. It is therefore necessary, to design a tailored interface to allow direct memory access between the Blue Point 100 and the OL800 controller without violating either system's architecture scheme.

SUMMARY OF THE INVENTION

Briefly stated, the present invention is directed to an interface system for a printer and a print font chip. The interface system comprises an I/0 port which receives from the printer address bits, data bits and control logic. A memory bus is electrically connected to the I/0 port. The memory bus transmits and receives address bits, data bits and control logic from the I/0 port. At least one print font chip is capable of generating address bits, data bits and control logic. Interfacing means interfaces the memory bus and at least one font chip. The interfacing means is bidirectional and capable of transmitting address bits, data bits and control logic. Bus request means requests access to the memory bus by the font chip. The bus request means is asserted to the interfacing means in the form of a bus request signal. DMA request means requests access to the memory bus by the interfacing means. The DMA request means is asserted to the memory bus in the form of a DMA request signal. The DMA request signal is assigned a predetermined priority by the memory bus. Priority means receives the DMA request signal from the memory bus and other DMA request signals from other devices and determines which DMA request signal has the highest priority. The priority means informs the memory bus of the highest priority DMA request signal. DMA acknowledgment means acknowledges the highest priority DMA request signal to the memory bus. The DMA acknowledgment means is asserted to the interfacing means as a DMA acknowledgment signal. Bus granting means grants access of the memory bus to the font chip by the interfacing means. The bus granting means is asserted to the font chip as a bus grant signal. Bus grant acknowledgment means acknowledges access to the memory bus by the font chip. The bus grant acknowledgment means is asserted to the interfacing means as a bus grant acknowledgment signal when the font chip has accessed the bus.

BRIEF DESCRIPTION OF THE DRAWINGS

The foregoing summary, as well as the following detailed description, will be better understood when read in conjunction with the appended drawings. For the purpose of illustrating the invention, the embodiments which are presently preferred are shown in the drawings. It is understood, however, that this invention is not limited to the precise arrangements and instrumentalities shown.

In the drawings:

FIG. 4 is a functional block diagram of the transceiver control operations of the interfacing system of FIG. 1.

DESCRIPTION OF PREFERRED EMBODIMENT

Figure 1:
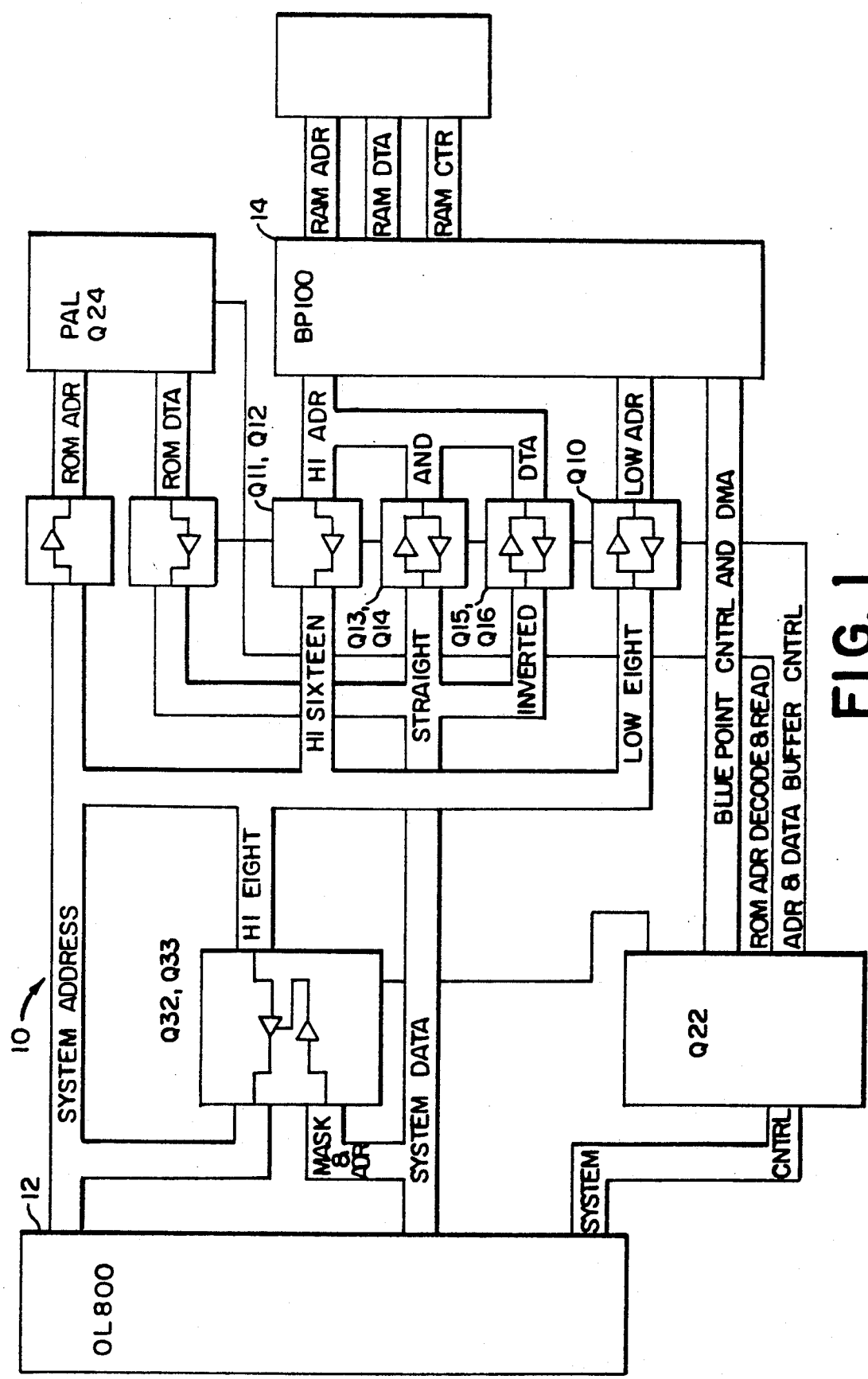
FIG. 1 is a functional block diagram of the interfacing system in accordance with the present invention.

Referring to the drawings in detail, wherein like numerals indicate like elements throughout, there is shown in FIGS. 1-4 a preferred embodiment of the interfacing system in accordance with the present invention.

The interfacing system is preferably, but not necessarily, in the form of an option card 10, which mounts as a daughter card onto a printer. While in the present invention the printer is an Okidata OL800 LED Page Printer (OL800), it would be apparent to a skilled artisan that any LED or electrophotographic page printer could be used. The OL800 12 is an eight-page per minute printer which contains a Motorola 68000 based controller. Data is transmitted and received in a manner well known in the art by the OL800 12 via an OL800 I/O port and a memory bus (not shown).

The option card 10 also includes a direct memory access (DMA) device. In the presently preferred embodiment, the DMA device is a BP100 font scaling chip (BP100) 14 from Blue Point Technologies, which supports all the features needed to render scalable print characters. A scalable character or font is one that is stored and then produced when needed at the desired size as graphic primitive instructions. This allows a printer the capability of achieving a maximum number of font size variations in a minimum amount of storage space.

A scalable character is stored in the form of an outline, i.e. a connected series of lines and arcs, which can be mathematically transformed into a filled bit image at a given size. A typical method for transforming a scalable character is to apply software algorithms to convert primitives; i.e. the lines and arcs, into bit images, which when connected are filled to create a solid object. The software algorithms are typically implemented on a general purpose MPU or RISC processor. In the preferred embodiment, the option card 10 uses the BP100 14 for creating characters.

DIRECT MEMORY ACCESS ARBITRATION

The BP100 14 font scaling chip employs standard Motorola architecture and procedures for obtaining direct memory access of the OL800 12 without processor intervention. The OL800 12 employs an arbitrating device, MB604111, for controlling access to the OL800 memory bus, primarily on the basis of priority. The OL800 memory bus comprises a plurality of inputs and outputs for receiving and transmitting data. Thus, peripheral devices (not shown) requesting access to the OL800 system memory via the OL800 I/O port are granted access to the OL800 memory bus based upon a predetermined prioritization of such peripheral devices with access to the memory bus being granted to the highest priority peripheral device requesting access to the memory bus at any given time.

Figure 2:
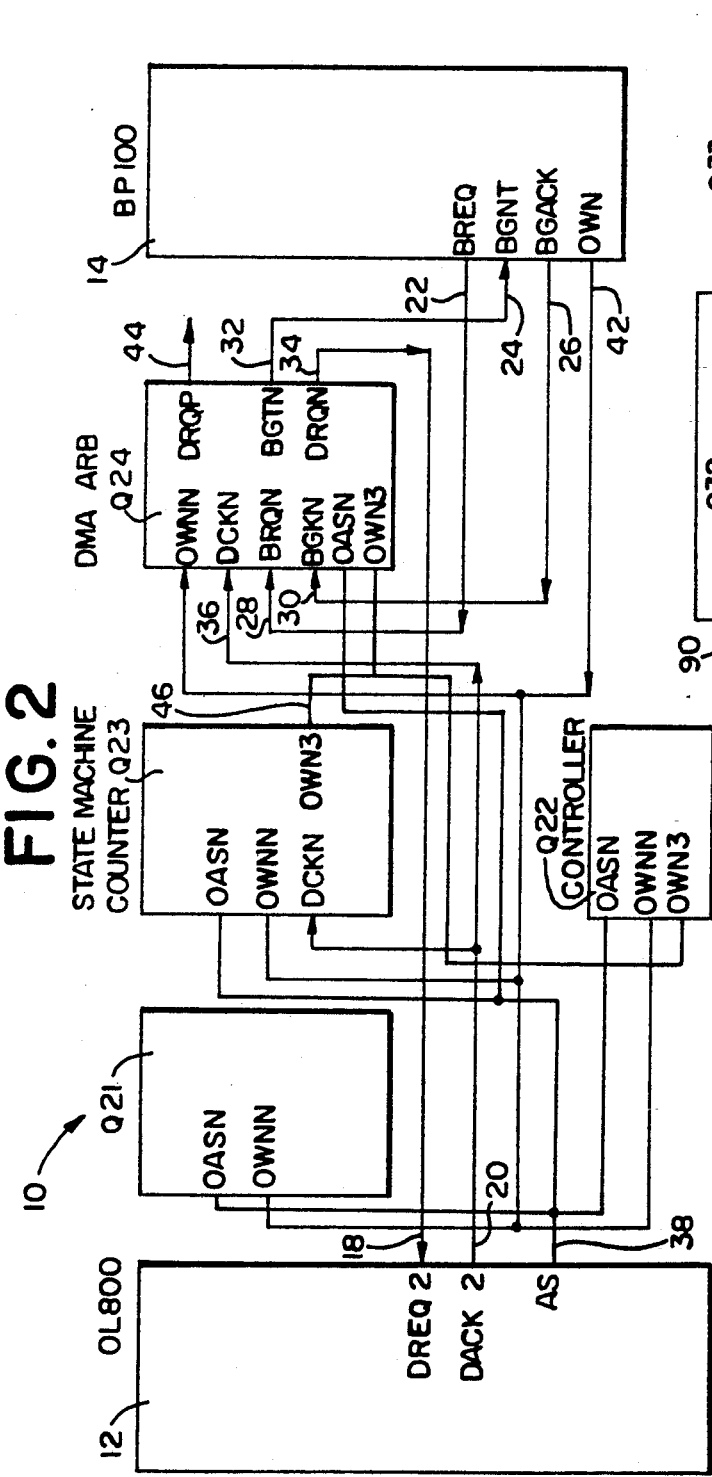
FIG. 2 is a functional block diagram of the DMA arbitration operation of the interfacing system of FIG. 1.

As shown in FIG. 2, the OL800 12 operates primarily on the basis of two digital signals. When a peripheral device is requesting access to the OL800 memory bus, the OL800 12 expects to receive a DMA request signal which, in the present embodiment, appears as a negative going pulse on the DREQ2 input 18 to the OL800 I/O port. When the OL800 12 determines that the particular peripheral device (in this embodiment the BP100) requesting access to the OL800 memory bus is entitled, due to its priority, to receive such access, the OL800 12 generates a DMA acknowledge signal in the form of a negative going pulse on its DACK2 output line 20 which is supplied to the requesting peripheral device. The requesting peripheral device must maintain its DMA request signal for the entire time that it requires access to the OL800 memory bus. When the requesting peripheral device no longer requires access to the OL800 memory bus, the OL800 12 expects the requesting peripheral device to relinquish its DMA request by discontinuing the negative pulse at the DREQ2 input 18 prior to the last memory cycle to be performed. The OL800 12 then discontinues the DMA acknowledge pulse to the requesting peripheral device effective at the beginning of that last memory cycle. Thereafter, access to the OL800 memory bus may be granted to any other peripheral device requesting access, again, on the basis of priority. However, higher priority devices can interrupt the current DMA device by requesting the bus. The DACK2 output 20 is removed from the current device at the beginning of the current bus cycle. After completion of the current cycle the DACKX output 20, where X=0, 1, 3, 0 being the highest cycle and 3 being the lowest cycle, is given to the higher priority device.

The BP100 14, as previously indicated, adheres to the standard Motorola procedure for obtaining access to a host device memory bus. Thus, when the BP100 14 wants to request access to a host's memory bus, it generates a bus request signal in the form of a negative going pulse at its BREQ output 22. When access to the host's memory bus is granted, the BP100 14 expects to receive a bus grant signal in the form of a negative going pulse which is received at its BGNT input 24. Upon receipt of a bus grant signal, the BP110 14 generates a bus grant acknowledge signal in the form of a negative going pulse on its BGACK output 26 and, thereafter, ends the bus request signal on its BREQ output 22. The BP100 14 continues to furnish the bus grant acknowledge pulse at its BGACK output 26 for as long as it needs to access the memory bus. When the BP100 14 has completed its memory operation, it ends the bus grant acknowledge signal by ending the BGACK output 26 at the conclusion of its memory cycle, thereby informing the arbitrating device that it no longer requires access to the memory bus. Motorola devices do not expect to be interrupted from access to the bus once access has been granted.

In developing a system in which the BP100 14 operates in conjunction with the OL800 12 via the OL900 I/O port (not shown), it is necessary to produce an interface to permit the BP100 14 to obtain direct memory access to the OL800 memory utilizing the OL800 memory bus. In the presently preferred embodiment, the interface comprises an option card 10 which includes a number of programmable array logic (PAL) devices which are connected between the BP100 14 and the OL800 12. Programmable array logic device (PAL) Q24 acts as the DMA arbiter and receives the bus request signal from the BP100 14 at its BRQN input 28 and the bus grant acknowledge signal from the BP100 14 at its BGKN input 30. The PAL Q24 provides a bus grant signal from its BGTN output 32 to the BGNT input 24 of the BP100 14. Similarly, PAL Q24 transmits a DMA request signal from DRQN output 34 to the OL800 DREQ2 input 18. When the OL800 memory bus is ready to receive or transmit data, the OL800 12 provides a DMA acknowledge signal from its DACK2 output 20 to PAL Q24 at its DCKN input 36.

The PAL Q24 is programmed to permit the BP100 14 to request and obtain direct memory access from the OL800 memory bus in the following manner. When the BP100 14 wants to obtain direct memory access, it generates a bus request signal in the form of a negative pulse which is provided to BRQN input 28 of PAL Q24. Upon receipt of the bus request signal, the PAL Q24 generates a negative going signal from DRQN output 34 which is provided to the OL800 12 at its DREQ2 input 18. When the OL800 12 decides to grant access to the OL800 memory bus to the BP800 14, the OL800 12 generates a DMA acknowledge signal in the form of a negative going pulse on DACK2 output 20 which is received on DCKN input 36 of PAL Q24. Upon receipt of the DMA acknowledgment signal, the PAL Q24 generates a negative going signal on BGTN output 32 which is sent as a bus grant signal to BGNT input 24 of the BP100 14. The BP100 14, believing that it has received a bus grant signal, generates a bus grant acknowledge signal in the form of a negative going pulse from BGACK output 26 which is provided to BGKN input 30 of PAL Q24. The BP100 14 also ends or deasserts its bus request signal by ending the negative pulse BREQ output 22 to BRQN input 28 of PAL Q24. The BPI00 14 is then able to utilize the OL800 memory bus to transfer addresses and data in a manner described below.

As indicated above, the OL800 12 expects to receive a DMA request signal during the entire time that the BP100 14 desires access to the OL800 memory bus. Since the BP100 bus request signal (BREQ 22) is discontinued when the BP100 14 generates a bus grant acknowledge signal, PAL Q24 must generate a negative going signal as DRQN output 34 as long as the BP100 14 continues to maintain its bus grant acknowledge signal. To do so, the PAL Q24 acts as a bistable, multivibrator or flip-flop to provide DRQN output 34 when an input BREQ 22 or BGACK 26 is received, and to discontinue the DRQN output pulse 34 only when no input signal is received at either of these inputs. In this manner a DMA request signal is applied to the OL800 12 whenever the BP100 14 generates a bus request signal or a bus grant acknowledge signal.

EXTRA ADDRESS STROBE

Figure 3:
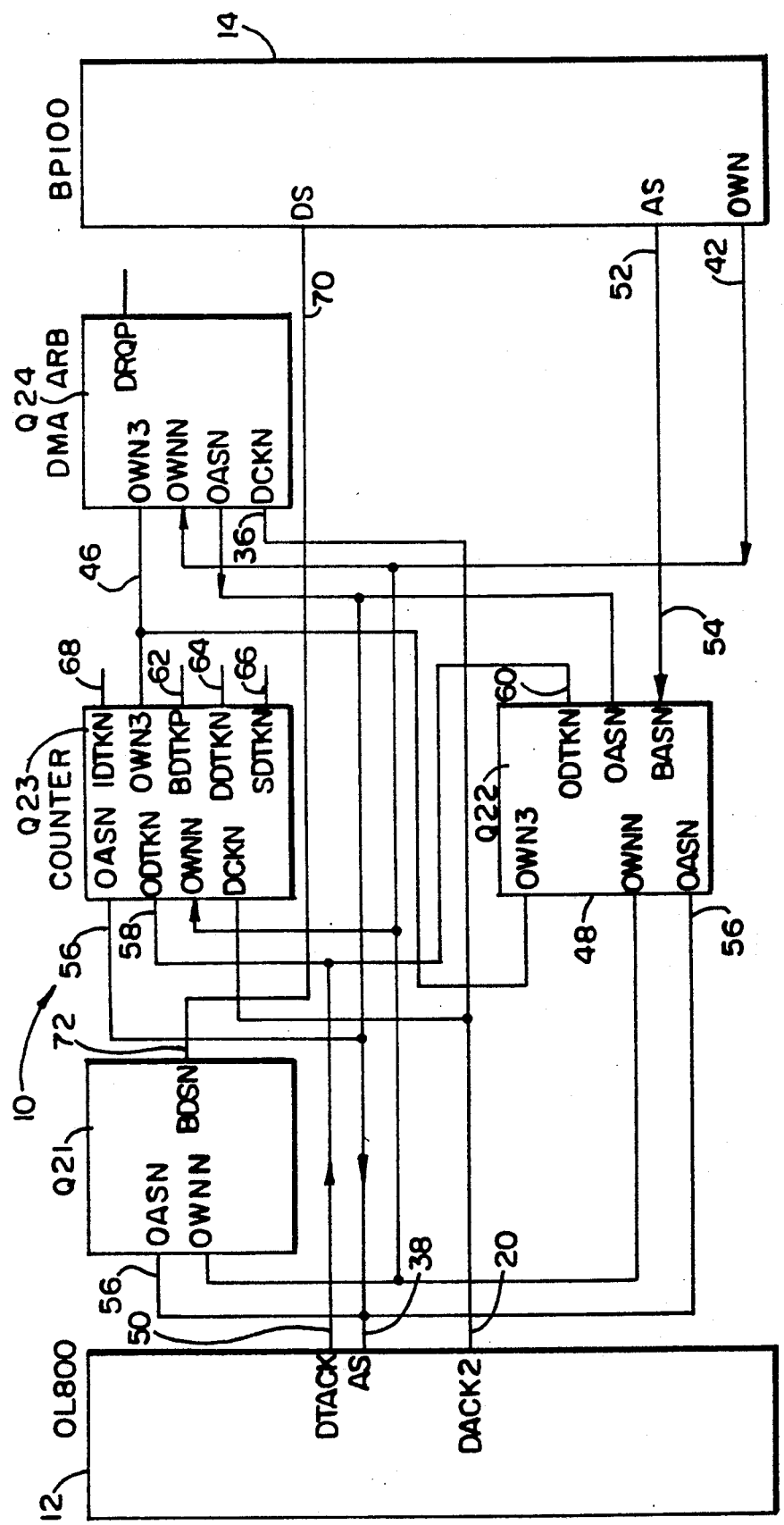
FIG. 3 is a functional block diagram of the delayed DTACK operation of the interfacing system of FIG. 1.

As previously indicated, the OL800 12 expects a requesting device to deassert or end a DMA request signal prior to, but not after, the last memory cycle to be performed. The BP100 14, on the other hand, expects to tell the arbitrating device that it has completed its need for memory bus access when it has actually completed its need for access to the memory bus at the end of a memory cycle. As shown in FIG. 3, in order for the OL800/BP100 interface to properly function, an extra or dummy address strobe AS 38 must be generated to cause one more memory cycle to occur after the BP100 14 has completed its need for access to the OL800 memory bus, so that the OL800 12 realizes that the BP100 DMA request has been withdrawn and can end the BP100 access cycle by eliminating the DMA acknowledge signal to the BP100 14.

A state machine counter located in a programmable array logic device (PAL) Q23 is used to assert the dummy address strobe to the OL800 memory bus. The state machine counter also coordinates the operation of the BP100 DMA cycle and the OL800 data acknowledgment signal. PAL Q23 generates OWN signals which indicate each state of the counter and are arranged so that OWN3 is the most significant bit of the counter while OWN1 is the least significant bit. The count sequence is 7-6-4-5-3-2-0-1. This sequence was chosen because it is a Gray code sequence where only one bit changes state at a time.

During the BP800 DMA cycle, a negative OWN signal 42 is generated from the B100 14 and is received by PAL Q24 as DRQN input 34. When the OWN signal 42 is asserted during the BP100's DMA cycle, the counter is allowed to progress from a state 7 to a state 6. When the BP100 14 has completed its DMA cycle, it deasserts its bus grant acknowledgment signal at BGKN input 30 to PAL Q24. The PAL Q24 also deasserts the OL800 negative DMA request signal at DRQN output 34. At the same time, the PAL Q24 asserts a positive DMA request signal from output DRQP 44, which acts as a bistable flip-flop.

At the end of the BP100 DMA cycle, the OWN signal 42 is deasserted and the state machine counter is allowed to progress to state 3. At this point, PAL Q23 asserts an OWN3 signal 46. The OWN3 signal 46 is transmitted to two other programmable array logic devices (PAL) Q22 which acts as a controller, and Q24. The state machine counter holds at state 3 until the assertion of the data acknowledgment signal on DTACK output 50 from the OL800 12.

Upon the assertion of the OWN3 signal 46, PAL Q22 asserts an address strobe signal as OASN output 56 to the OL800 12 as AS input 38. The address strobe signal sends an extra dummy address cycle to the OL800 12 which acts as the last DMA cycle to the OL800 12. The OL800 12 requires this additional cycle to indicate to the OL800 12 that the DMA request signal at DREQ input 18 has been deasserted.

DELAYED DATA ACKNOWLEDGE

The OL800 data acknowledgment signal is normally requested by the processor or a direct memory accessing peripheral in response to a bus accessing request in this case the BP100 14. It is important that the data acknowledgment signal not be asserted before the memory is ready to transfer data.

The OL800 12 asserts a data acknowledgment signal as DTACK output 50 for random access memory (RAM) operations immediately upon the beginning of a DMA cycle. The OL800 memory (not shown) uses a Motorola 68000 microprocessor at 10 MHz. The 120 nanosecond dynamic random access memory (DRAM) that is chosen to run with the 68000 is able to operate with no wait states. However, the BP100 14 must operate at 16 MHz for adequate throughput, which is too fast for the OL800 memory DRAM to operate. It is therefore necessary to add a delay chain to the OL800 data acknowledgment signal so that the DRAM operates properly.

The OL800 12 transmits a data acknowledgment signal during the last cycle of its direct memory access (DMA) arbitration period. An important structural difference between the BP100 14 and the OL800 12 is that the BP100 14 relinquishes the OL800 DMA request signal immediately after the BP100 14 has finished its DMA cycle. The OL800 12 requires that the requesting device relinquish the DMA request signal prior to and not after the last cycle of the direct memory accessing to be performed. In order for the OL800 12 to function properly, an extra address strobe must be generated to operate as a dummy cycle after the last BP100 DMA cycle in order for the OL800 DMA arbitrating device to recognize that the DMA request signal has been deactivated.

Concurrently, during the assertion of the OWN 3 signal 46, the OL800 12 asserts a data acknowledgment signal at DTACK output 50 to PAL Q23 at ODTKN input 58 and to PAL Q22 at ODTKN input 60. Since the OL800 12 is performing its last DMA cycle, the DMA acknowledgment signal at DACK2 output 20 is still being asserted to PAL Q24 as DCKN input 36.

A set-reset flip-flop is asserted from PAL Q23 as BDTKP output 62 and enables the delay for the data acknowledgment signal to operate when both the OL800 DMA acknowledgment signal and the OL800 address strobe are asserted as DACK2 output 20 and AS input 38, respectively. In the case of a higher priority device seeking access to the memory bus, the DMA acknowledgment signal is deasserted at DACK2 output 20, thus causing the BDTKP signal 62 to be totally disabled and the delay chain to be discontinued. This prevents the data acknowledgment signal from being transmitted to the BP100 14. At the end of the last OL800 DMA cycle, the OL800 address strobe is deasserted at AS input 38 causing the delay chain to be disabled and resetting the BDTKP flip-flop.

The first clock in the delay chain is asserted as DDTKN output 64 from PAL Q23 which causes the first delay in the chain. The DDTKN signal 64 clocks the OL800 data acknowledgment signal ODTKN 58 through to the next state of the counter, state 2. A second clock, SDTKN 66, clocks the state of the DDTKN signal 64 to the next state of the counter which is state 0. The SDTKN signal 66 asserts the negative IDTKN signal 68. The negative IDTKN signal 68 is a set-reset flip-flop. The negative STDKN signal 66 sets the negative IDTKN flip-flop and allows the IDTKN signal 68 to be transmitted to the BPI00 14. As can be seen, a minimum of two clocks delay the data acknowledgment signal to the BP100 14. The maximum number of clocks which can be used is three.

It is necessary to have at least two delay sequences for the OL800 DTACK signal 50 because the BP100 14 is capable of doing a read-modify-write sequence (RMW). A read-modify-write sequence allows the processor to read the contents of a word at a given address and then write back different contents at the same address during a single cycle. The OL800 memory bus, on the other hand, is only capable of doing either a read instruction or a write instruction in a single address during a single cycle. Therefore, a separate data acknowledgment delay chain is needed for each read phase and write phases of the BP100 cycle. During the read-modify-write sequence of the BP100 14, the BP100 14 produces two data strobes, one for the read phase and one for the write phase of the cycle. The data strobes send a negative pulse as DS output 70 from the BP100 14 to PAL Q23 as BDSN input 72 in order to remove the negative IDTKN signal 68 from PAL Q23 when the BP100 14 data strobe is deasserted by the circuit. The negative IDTKN signal 68 is fed back to the previous stages of the counter to reset them when the negative IDTKN signal 68 again asserts. This results in a maximum delay occurring when the negative IDTKN signal 68 deasserts so that a full delay cycle can be achieved.

TRANSCEIVER CONTROL

Logic is necessary to control the enabling of the font coprocessor transceivers at the proper times. The logic is derived in PAL Q24. The control of the transceivers is necessary both for the BP100 14 to access memory from the OL800 12 and for the OL800 memory bus to deliver data to the BP100 14.

Because the OL800 12 requires memory cycles containing 24 bits and the BP100 14 has a data bus containing 16 bits, an internal address strobe is generated in order for latches to form the upper most 16 bits. The dummy address strobe generates a memory cycle containing 16 bits which latch into the upper portion of the BP100 address register at the same time the OL800 address bits are received by the BP100 address register. It is important to control the upper address bits generated as well as the OL800 data being transmitted to the BP100 14 or vice versa.

Referring to FIG. 4, a lower address transceiver direction control signal LAIN output 74 is initiated by PAL Q24 when PAL Q24 receives an OWN input signal 42 from the BP100 OWN output 42. The LAIN signal 74 is the inversion of the OWN signal 42. The BP100's OWN signal 42 controls the direction of the lower address transceiver signal. When the OWN signal 42 is asserted, the addresses are directed from the BP100 14 to the OL800 memory bus for master mode operation. The master mode operation is in effect during the direct memory accesses (DMA). When the OWN signal 42 is deasserted, the addresses are directed from the OL800 12 to the BP100 14 for slave mode operation. The slave mode operation occurs when the OL800 12 transmits a data acknowledgment signal to the BP100 14, thereby indicating that the OL800 12 is ready to perform a read or write operation.

When the BP100 14 is in the master mode, the OWN signal 42 is provided to PAL Q24. At the same time, a direct memory access signal from the OL800 12 at DACK2 output 20 is provided to PAL Q24 at DCKN input 36 in order for PAL Q24 to assert the lower address enable signal at LAEN output 76. The lower address enable signal is a set-reset flip-flop which enables the transceiver at the appropriate time to prevent bus contention, i.e., more than one device accessing the bus at the same time. When the address strobe is asserted by the OL800 12 at AS input 38 from PAL Q24 OASN output 56, the state of the flip-flop of the lower address enable signal is retained. The lower address enable signal remains asserted until the current bus cycle is finished, even if a setting condition is removed from the cycle. The lower address enable signal causes the lowest 8 bits of memory at transceiver Q10 to be transmitted in the appropriate direction. Therefore, when the direct memory access signal at DCKN input 36 is removed from PAL Q24 by a higher priority device requesting the bus, the lower address enable signal remains asserted for the remainder of the current bus cycle. At the end of the bus cycle, the lower address enable signal is deasserted to remove the BP100 14 from the OL800 memory bus. The lower address enable signal is asserted for the duration of the time that the BP100 14 is in the slave mode.

A second signal enables the upper 16 bits of memory address. The upper address enable signal is also a set-reset flip-flop which is asserted for the duration of the current bus cycle. The OL800 12 must assert the direct memory access signal at DACK2 output 20 to assert the upper address enable signal at UAEN output 78 from PAL Q24. The BP100's 16 bits are stored as the upper 16 address bits in latches Q11 and Q12 and are transmitted to the OL800 12. The upper address enable signal is enabled by PAL Q24 at UAEN input 78. A positive upper address strobe signal is the inverted form of the negative upper address strobe signal generated from the BP100 14 at UASP output 84. The positive upper address strobe signal is transmitted to latches Q11 and Q12 at UASP input 84 to latch the upper address signals from the BP100 14 during master mode operation. The latching is done because the upper address signals are multiplexed onto the BP100 data bus internal to the BP100 14.

A data bus invert enable signal is asserted at INVN output 88 from PAL Q24 and is used to enable data connected to transceivers Q15 and Q16 onto the OL800 memory bus. The invert enable signal inverts the bit order of the BP100 data bus to match that of a OL800 DVC chip (not shown) during master mode read-modify-write (RMW) operations. The DVC chip serializes data to the OKI I/0 port 12 in exactly the opposite bit order of the BP100 character formation. The invert enable signal is asserted when the data buffer enable signal at DBEN output 94 and the read-modify-write signal at RMW output 96 are asserted by the BP100 14 to PAL Q24 as DBEN input 94 and RMWP input 96.

When the data buffer enable signal is asserted by the BPI00 14, it is also transmitted to PAL Q23 at DBEN input 94. Likewise, the read-modify-write signal is received by PAL Q23 at RMWP input 96. When the data buffer enable signal is asserted and the read-modify-write signal is deasserted, PAL Q23 asserts a data bus straight enable signal at STRN output 98. The straight enable signal is used to enable data at transceivers Q13 and Q14 onto the OL800 data bus. The straight enable signal is used to connect the BP100 data bus to the OL800 data bus during slave mode and master mode read only memory (ROM) accesses. Essentially, these occur during DMA accesses which occurs during the master mode operation and the read functioning during the delayed data acknowledgment signal from the OL800 memory bus. In summary, the transceiver control is used to guarantee that the appropriate transceivers are enabled so that the OL800 12 can communicate with the BP100 14.

BAND BUFFER CONTROL

A typical printed page layout when using the OL800 12 has a basic resolution of 300 dots per inch (DPI) A page being 8½ inches in width has a dot line that is 2,560 dots wide. If there is 1 dot per bit, this equates to 320 Bytes or 160 words of data per dot line. A band buffer is a section of dynamic random access memory (DRAM) that is a minimum of 64 Kbytes in size or multiples thereof. Therefore, a 64 Kbyte (actually 65,536 Bytes) band buffer can do 204.8 lines of data. However, the BP100 only accepts an integral number of lines of data.

A full page of DRAM (approximately 1.5 Mbytes) is too costly to the average user. Therefore, a smaller increment of DRAM per print page is necessary. A band buffer is a small section of DRAM that is used as a "roller" to print down the page. By using a band buffer to print a page on a rolling basis instead of a full page of DRAM, it is more cost efficient to the user. The characters are written into the band buffer upstream of where the OL800 memory is printing. The OL800 memory is also capable of taking data out of the buffer as it is printing. However, in order for the OL800 memory to adequately interface with the BP100 14 via the 0800 I/0 port, it is necessary for the BP100 14 to believe there is a full page of DRAM in the system when in reality there is not.

Figure 5:
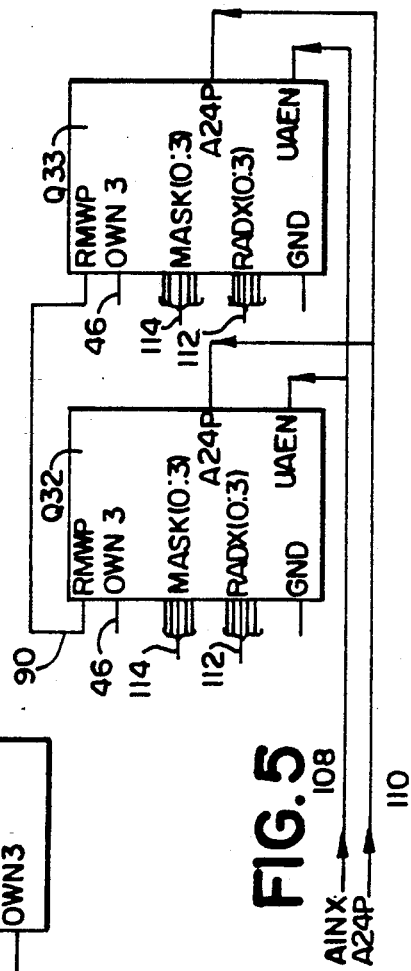
FIG. 5 is a functional block diagram of the band buffer control operations of the interfacing system of FIG. 1.

The band buffer is controlled by two PALS, Q32 and Q33 (shown in FIG. 5). The PALS Q32 and Q33, fool the BP100 14 into thinking that it has an infinitely large block of DRAM. In this manner, the BP100 14 can continuously produce character data without having to worry about exactly where the character data goes into the DRAM. This is accomplished by causing the higher order address bits produced by the BP100 14 to be discarded and replaced by dummy addresses. As a result, the OL800 memory can handle data to be printed in band buffer blocks of data in multiples of 64 Kbytes.

The BP100 address bits are received by transceiver, Q10, and latches Q11 and Q12. The first transceiver Q10 receives and transmits the lowest 8 address bits. Latch Q11 receives and stores the middle 8 address bits and latch Q12 receives and stores the upper 8 address bits. By replacing the BP100's upper 8 address bits with a dummy address strobe, it is possible to keep rolling over the same 64 Kbyte band buffer using the lower 16 address bits. In this manner, the BP100 14 is coerced in believing that the OL800 memory is much greater than its actual size.

PALS Q32 and Q33 which control the band buffer serve two functions. The first function is to store a mask Byte that controls the upper eight address bits. The second function is to store an address Byte to replace the masked address bits. This function can only occur when the BP100 14 is doing a master mode read-modify-write function to the RAM while generating characters. The masking cannot occur when the master mode is reading the read-only memory (ROM). The masked bits are a pattern of bits used to flexibly control the retention or elimination of the upper 8 BP100 address bits. In this instance, it is to eliminate the upper 8 bits from the BP100 14 and generate dummy addresses so that the same block of RAM is continually "rolled over".

Each PAL Q32 and Q33 performs a Boolean function which is repeated four times for each PAL or a total of eight times to make a Bytes worth of controlled address signals. The Boolean function is as follows:

```
!AOUTX  = !OWN3
        # !AINX &   !RMWP
        # !AINX &   RMWP &   !A24P
        # !RADX &   RMWP &   A24P &   !MSKX
        # !AINX &   RMWP &   A24P &   MSKX
``` where #=OR;$=AND; !=NOT. The signals designated by an X in their name are those signals that are germane to that particular signal channel, whereas the other signals are common to all the channels.

In the first line of the Boolean function, when the OWN3 signal 46 generated by the counter goes low, the output lines are forced low or to a zero address. This is necessary to prevent the BP100 14 from occasionally writing garbage to random locations if the read-modify-write signal is activated in the middle of the dummy cycle. By forcing the addresses to zero, all dummy addresses are made safely to program cartridge erasable programmable read-only memories (EPROM). The deassertion of the OWN3 signal 46 also signified the assertion of the OL800 data acknowledgment signal and the initiation of the data acknowledgment delay sequence.

According to the second line of the Boolean function, when the read-modify-write signal at RMWP input 96 deasserts, the address input at AINX input 108 of PALS Q32 and Q33 is coupled straight through to the output. This causes the band buffer control programmable array logic devices to be transparent during the master mode ROM read operations. During master mode operations, the direction of the address bits is from the BP100 14 to the OL800 12.

According to the third line of the Boolean function, when the read-modify-write signal at RMWP input 96 asserts and the A24P input 110 of PALS Q32 and Q33 is low, address input AINX 108 of PALS Q32 and Q33 is coupled through to the output. This results in the band buffer control being transparent to the middle and lower address bits during read-modify-write sequences to the RAM. The upper address bits are still exposed to the band buffer control in order to continue to generate masked address bits. This process occurs when the BPI00 is creating characters that will get cached elsewhere in the random access memory (RAM) and not put directly into the band buffer.

In the fourth line of the Boolean function, when PALS Q32 and Q33 receive an asserted read-modify-write signal at RMWP input 96 and A24P, input 110 is high and PALS Q32 and Q33 assert the latched registered address at RADX input 112 of PALS Q32 and Q33 is coupled to the output. This causes the preset address to couple to the output when doing read-modify-write sequences to the random access memory (RAM) when the particular address bit is masked.

In the fifth line of the Boolean function, when PALS Q32 and Q33 receive an asserted read-modify-write signal at RMW input 96 and A24P, input 110 is high and PALS Q32 and Q33 receive a deasserted mask signal MSKX 114, the address input AINX 108 is coupled through to the output by PALS Q32 and Q33. This causes the band buffer control to be transparent during read-modify-write sequences to their random access memory (RAM) when the particular address bit is not masked.

As described above, the Boolean function is repeated four times for each of PALS Q32 and Q33 or eight times total to make up of Bytes worth of controlled address signals.

From the foregoing description, it can be seen that the present invention comprises an interface system for a printer and a print font chip. It will be recognized by those skilled in the art that changes may be made to the above-described embodiment of the invention without departing from the broad invention concept thereof. It is understood, therefore, that this invention is not limited to the particular embodiment disclosed, but is intended to cover all modifications which are within the scope and spirit of the invention as defined by the appended claims.

We claim:

1. An interface system for a printer and a print font chip comprising:

an I/O port, said I/O port receiving from the printer address bits, data bits and control logic;

a memory bus, said bus being electrically connected to said I/O port, said bus being bi-directional and receiving address bits, data bits and control logic from said I/O port;

at least one print font chip, said font chip capable of generating address bits, data bits and control logic;

interfacing means for interfacing said memory bus and said at least one font chip, said interfacing means being bidirectional and capable of transmitting address bits, data bits and control logic;

bus request means for requesting access to said memory bus by said font chip, said bus request being asserted to said interfacing means in the form of a bus request signal;

DMA request means for requesting access to said memory bus by said interfacing means, said DMA request means being asserted to said memory bus in the form of a DMA request signal, wherein said DMA request signal is assigned a predetermined priority by said memory bus;

priority means for receiving said DMA request signal from said memory bus and other DMA request signals from other devices and determining which DMA request signal has the highest priority, said priority means informing said memory bus of the highest priority DMA request signal;

DMA acknowledgment means for acknowledging said highest priority DMA request signal by said memory bus, said DMA acknowledgment means being asserted to said interfacing means as a DMA acknowledgment signal;

bus granting means for granting access of said memory bus to said font chip by said interfacing means, said bus granting means being asserted to said font chip as a bus grant signal; and bus grant acknowledgment means for acknowledging access to said memory bus by said font chip, said bus grant acknowledgment means being asserted to said interfacing means as a bus grant acknowledgment signal when said font chip has accessed said bus.

2. The interface system according to claim 1, further comprising a counter, said counter having a plurality of states for coordinating the accessing of the bus by said font chip, wherein said counter states are run in cycles.

3. The interface system according to claim 1, wherein said bus grant acknowledgment signal is asserted for the entire duration that the font chip is accessing the bus, wherein said font chip accesses said bus for an integral number of cycles which are defined by said counter.

4. The interface system according to claim 1, wherein said bus request signal is negated by said font chip when said font chip asserts said bus grant acknowledgment signal.

5. The interface system according to claim 1, wherein said DMA request signal is received by said memory bus for the entire duration that said font chip is accessing said bus.

6. The interface system according to claim 1, wherein said microprocessor chip relinquishes said bus when said font chip has completed accessing said bus.

7. The interface system according to claim 6 further comprising an address strobe, said strobe being asserted to said memory bus when said font chip relinquishes said memory bus, wherein said strobe acts a final accessing cycle to said memory bus.

8. The interface system according to claim 7, wherein said DMA acknowledgment signal is asserted by said memory bus for the duration in which said font chip accesses said bus and during the assertion of said address strobe.

9. A hardware interface system for a printer and a print font chip comprising:
- an I/O port, said I/O port being integral with the printer and receiving from the printer address bits, data bits and control logic;
- a memory bus, said bus being electrically connected to said I/O port, said bus transmitting and receiving the address bits, data bits and control logic from said I/O port;
- at least one print font chip, said font chip capable of generating address bits, data bits and control logic;
- interfacing means for interfacing said memory bus and said at least one font chip, said interfacing means being bidirectional and capable of transmitting address bits, data bits and control logic between said bus and said chips; and
- bus arbitration means for accessing said memory bus by said at least one font chip, said arbitration means being characterized in terms of priority, wherein said font chips are assigned a predetermined priority by which access to said memory bus is determined.

10. A hardware interface according to claim 9, wherein said bus arbitration means further comprises:
- bus request means for requesting access to a memory bus by said at least one font chip, said bus request means being asserted to said interfacing means in the form of a request signal.

11. A hardware interface according to claim 10, wherein said bus arbitration means further comprises:
- DMA request means for requesting access to said memory bus by said interfacing means, said DMA request means being asserted to said memory bus in the form of a DMA request signal, wherein said memory bus assigns said DMA request signal a predetermined priority.

12. A hardware interface according to claim 11, wherein said bus arbitration means further comprises:
- priority means for receiving said request signal from said memory bus and determining which DMA request signal has the highest priority, said priority means informing said memory bus which DMA request signal has the highest priority.

13. A hardware interface according to claim 12, wherein said bus arbitration means further comprises:
- DMA acknowledgment means for acknowledging said highest priority DMA request signal to said interfacing means by said memory bus, said DMA acknowledgment means being asserted to said interfacing means as a DMA acknowledgment signal.

14. A hardware interface according to claim 13, wherein said bus arbitration means further comprises:
- bus granting means for granting access to said memory bus to said at least one font chip having the highest priority by said interfacing means, said bus granting means being asserted to said at least one font chip as a bus grant signal.

15. A hardware interface according to claim 14, wherein said bus arbitration means further comprises:
- bus grant acknowledgment means for acknowledging access to said memory bus by said at least one font chip, said bus grant acknowledgment means being asserted to said interfacing means as a bus grant acknowledgment signal when said font chip has accessed said bus.

16. A hardware interface according to claim 15 further comprising a counter, said counter having states for coordinating the accessing of the bus by the font chip, wherein said counter runs in cycles based on the length of time, said font chip occupies said memory bus.

17. A hardware interface according to claim 16, wherein said bus acknowledgment signal is asserted for the entire duration that the font chip is accessing the bus, wherein said font chip accesses said bus for an integral number of cycles.

18. A hardware interface according to claim 10, wherein said bus request signal is negated by said font chip when said font chip asserts said bus acknowledgment signal.

19. A hardware interface according to claim 11, wherein said DMA request signal is received by said memory bus for the entire duration that said font chip is accessing said bus.

20. A hardware interface according to claim 18, wherein said font chip relinquishes said bus when said font chip is finished accessing said bus.

21. A hardware interface according to claim 20 further comprising an address strobe, said strobe being asserted to said memory bus when said font chip relinquishes said memory bus, wherein said strobe acts as a final accessing cycle to said memory bus.

22. A hardware interface according to claim 13, wherein said DMA acknowledgment signal is asserted by said memory bus for the entire duration in which said font chip accesses said bus and during the assertion of said address strobe to said memory bus.

23. A hardware interface according to claim 19 further comprising an interrupt means for interrupting the accessing of said memory bus by said font chip to a DMA device of higher priority which transmits a bus request signal to request access to said memory bus.

24. A hardware interface according to claim 23, wherein said first font chip regains access of said memory bus after said DMA device of higher priority has relinquished said memory bus.

25. A hardware interface according to claim 21 further comprising data acknowledgment means for acknowledging a bus request signal of said font chip by said memory bus, said data acknowledgment means being transmitted in the form of a data acknowledgment signal sometime during the assertion of said address strobe.

26. A hardware interface according to claim 24 further comprising delay means for delaying the assertion of said data acknowledgment signal to said font chip, wherein said delay means is terminated when said address strobe is deasserted.

27. A hardware interface according to claim 24 further comprising at least two data strobes, wherein said first data strobe signifies a read instruction by said font chip and said second data strobe signifies a write instruction by said font chip.

28. A hardware interface according to claim 27, wherein said delay means is asserted for each said first data strobe and said second data strobe.

29. A hardware interface according to claim 28 further comprising transceiver means for controlling the direction of address bits between said font chip and said bus, said transceiver means distinguishing between lower bits, middle bits, and upper bits of a data stream, wherein each of said lower bits, middle bits, and upper bits comprise a block of address bits.

30. A hardware interface according to claim 29 further comprising inverting means for inverting the order of data bits received from the font chip and transmitting the inverted bits to said data bus.

31. The hardware interface according to claim 30 further comprising data buffer enable means for enabling the data bits of said I/0 port, and said font chip to enter said transceiver means, the assertion of said data buffer enable means causing the assertion of said inverting means.

32. A hardware interface according to claim 31 further comprising latching means for latching the upper address bits contained in said transceiver means, said latching means multiplexing the upper and middle address bits onto said memory bus.

33. The interface system as recited in claim 32 further comprising band buffer means for transmitting a predetermined number of upper address bits from said font chip which are transmitted via said transceiver means to the printer.

34. The interface system as recited in claim 33 further comprising printing means for printing data bits received by said band buffer means onto a printed page.

35. The interface system as recited in claim 34, wherein said font chip sends additional lower and middle address bits via said transceiver means to address said band buffer means while said printing means prints said data bits previously received by said band buffer means.

36. The interface system as recited by claim 35 further including masked bytes for receiving the upper address bits from said transceiver means, said masked bytes preventing said upper bits from entering said I/0 port.

* * * * *